March 6, 1934.  S. J. GOTHAM  1,949,568

PEDAL SUPPORTED CIRCUIT CLOSER FOR MOTOR VEHICLES

Filed May 19, 1932

INVENTOR
STEPHEN J. GOTHAM
By Mason Fenwick & Lawrence
Attorneys

Patented Mar. 6, 1934

1,949,568

UNITED STATES PATENT OFFICE 1,949,568

PEDAL SUPPORTED CIRCUIT CLOSER FOR MOTOR VEHICLES

Stephen J. Gotham, Fall River, Mass., assignor of one-half to Ralph W. Thomas, Fall River, Mass.

Application May 19, 1932, Serial No. 612,315

2 Claims. (Cl. 200—59)

The invention forming the subject matter of this application is a circuit closer adapted to be attached to one of the pedals of a motor vehicle for the purpose of operating direction signals at the front and/or rear of the vehicle.

The main object of the invention is to provide a motor vehicle with means by which the operator of the vehicle can signal to pedestrians, traffic officers and drivers of other machines, the intention of the operator to make a right or left hand turn. Preferably, the device is used in connection with electric signals having suitable indicating characters which may or may not be colored to indicate the direction of the turn.

Preferably, the attachment forming the present invention is secured to the clutch pedal of the motor vehicle; because it is customary with drivers when making a turn to have their foot on this pedal so that they may be able to stop the vehicle suddenly if occasion should arise. This is particularly true where traffic is congested.

Another object of the invention is to provide a device of this character comprising very few parts which can be readily assembled and taken apart, thereby lessening the cost of manufacture considerably.

A further object of the invention is to provide a device of this character which includes a signal operating bar or rod to control the operation of the signals selectively on either side of the vehicle.

Other objects of the invention will become apparent as the detailed description thereof proceeds.

Figure 1:
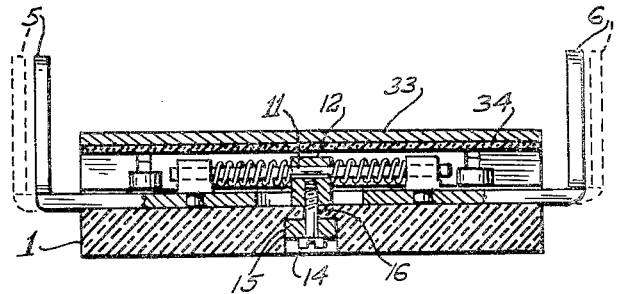
Figure 1 is a longitudinal section of the invention, taken on the line 1—1 of Figure 2.
Figure 2:
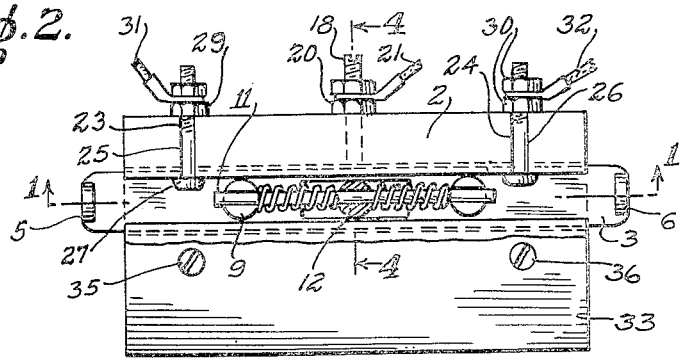
Figure 2 is a plan view of the invention, parts of the same being broken away to show details of construction.
Figure 3:
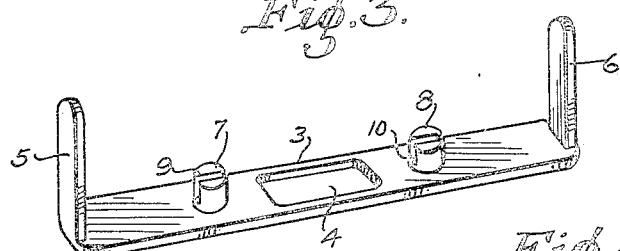
Figure 3 is a perspective view of the aforesaid operating switch bar.

As shown in the drawing, the invention comprises a base 1 of suitable insulating material and provided with an inverted T-shaped groove 2 in which is slidably mounted the operating plate 3. The plate 3 is provided at its center with a slot 4 and at its opposite ends with lugs 5 and 6 projecting upwardly from the plate to be engaged by one side or the other of the foot of the operator.

The plate 3 has slotted contacts 7 and 8 suitably secured thereto symmetrically on opposite sides of the slot 4. The contacts 7 and 8 are provided with aligned slots 9 and 10, respectively; and these slots slidably receive the opposite ends of a conductor bar 11 having its center suitably secured to a contact lug 12. This lug 12 is seated on the bottom of the T-shaped groove 2, and is held in position against said bottom by means of a machine screw 14 passing through a washer 15 and through an aperture 16 in the base 1 into a suitably tapped hole in the contact lug 12, as shown in Figure 1 of the drawing.

Figure 5:
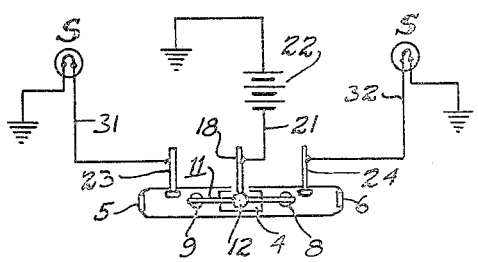
Figure 5 is a wiring diagram illustrating one of the uses of the invention.
Figure 4:
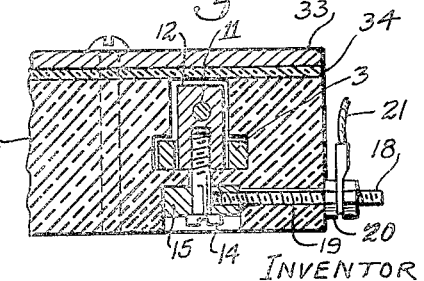
Figure 4 is a fragmentary transverse section taken on the line 4—4 of Figure 2.

The washer 15 is seated in a countersink 17 formed in the bottom of the base 1; and is bored radially as shown in Figure 4 of the drawing. This radial bore is tapped to receive a thread of a screwthreaded rod 18 which extends through an aperture 19 formed in the side of the base 1. The screwthreaded rod 18 is provided with lock nuts 20 which serve to clamp to rod 18, as a terminal, the wire 21 (see Figure 5) connected through a battery 22 to ground.

The right and left hand terminals of this circuit closer are formed by headed screwthreaded rods or lugs 23 and 24 seated in slots 25 and 26, respectively, formed in the upper face of the base 1. The slots 25 and 26 extend from one side of the base 1 and into the leg of the inverted T-shaped slot 2. The heads 27 and 28 of rods 23 and 24, respectively, are arranged in the path of movement of the contacts 7 and 8.

On their outer ends, the rods 23 and 24 are provided with the usual pairs of nuts 29 and 30 which serve to clamp the terminals of wires 31 and 32. It will be obvious that as the plate 3 is reciprocated in its T-shaped slot, the contact 7 or 8 will make contact with the heads 27 or 28, as the case may be, and will close the circuit from the battery 22 through the wire 21 and one or the other of the signal lights S of the vehicle.

The mechanism just described is protected by a cover plate 33, preferably of metal and of the same dimensions as the base 1. The cover plate 33 is separated from the base 1 by a sheet 34 of insulating material. The plate 33, sheet 34, and base 1 are provided with registering apertures adapted to receive machine screws 35 and 36, which not only serve to hold the cover plate and insulating sheet on the circuit closer but may also be used to mount the circuit closer as a whole upon one of the pedals of a motor vehicle.

It must be understood, of course, that while I have described this circuit closer as adapted for use on a foot pedal, it may be arranged in any convenient position on the vehicle and may be operated by hand; but preferably it is arranged on the vehicle for operation by the foot of the operator inserted between the projecting lugs 5 and 6.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim is:

1. A switch for alternatively closing two circuits comprising: a base, a contact lug fixed to said base, a plate reciprocable on said base adjacent said lug and having a pair of contacts secured thereto, conducting means slidably connecting said lug and contacts, and terminals secured to said base in the path of movement of said pair of contacts.

2. A switch for closing either of two circuits comprising a base, a contact lug fixed to said base, a conducting plate reciprocable on said base relative to said lug, a conductor bar fixed to said lug, contacts on said plate slidably connected to said bar, springs interposed between said contacts and lug, and contact lugs fixed to said base in the path of the contacts on said plate.

STEPHEN J. GOTHAM.